April 18, 1933.   C. SOHN   1,904,390
HEDGE TRIMMER
Filed Nov. 21, 1932

INVENTOR
Carl Sohn
Christian M. Newman ATTORNEY

Patented Apr. 18, 1933

1,904,390

UNITED STATES PATENT OFFICE

CARL SOHN, OF STRATFORD, CONNECTICUT

HEDGE TRIMMER

Application filed November 21, 1932. Serial No. 643,602.

My invention relates to a trimming device such as is adapted for trimming and clipping bushes, trees, foliage, and more particularly for trimming hedges, whereby an even and symmetrical appearance is to be obtained.

The invention belongs to the class of electrically driven trimmers, and more particularly those wherein the motor is contained within the trimmer unit, and more or less directly connected to the rotatable cutter member in a way to provide a portable trimmer that may be conveniently driven through the medium of a suitable electric wire connection, when plugged in a current socket.

An object of the invention is to provide a device of this kind wherein the mechanism including the motor is compactly formed and neatly enclosed within a light and durable casing, and whereby the teeth for engaging the foliage, and the single pair of rotary blades constitute the only exposed portion of the operating elements of the trimmer.

An important feature of the invention is that of providing a direct, though frictional, drive between the motor shaft and the fly wheel upon which the knives are carried, and to construct the wheel so that its outer rim portion will be relatively heavy to insure increased momentum, and consequently steady rotation of the wheel and its knives. In this respect, it is to be noted that both the motor and the knife-carrying fly wheel are mounted upon a common base, and that the axes of the fly wheel and the motor are at a right angle to each other, and that the knife blades operate on the upper side of the base plate between it and the fly wheel and the casing, so as to be fully protected and insure more effective cutting operations.

The trimmer is further provided with two suitable handles, one being attached to the top of the casing and the other to one side so that the implement can be conveniently supported and guided by the two hands of the operator.

Additional objects and advantages of the invention reside in the special construction, combination and arrangement of elements forming the invention, as more fully hereinafter described and claimed, reference being had to the accompanying sheet of drawing forming a part hereof, and wherein Fig. 1 shows a top plan view of my improved hedge trimmer;

Figure 1:
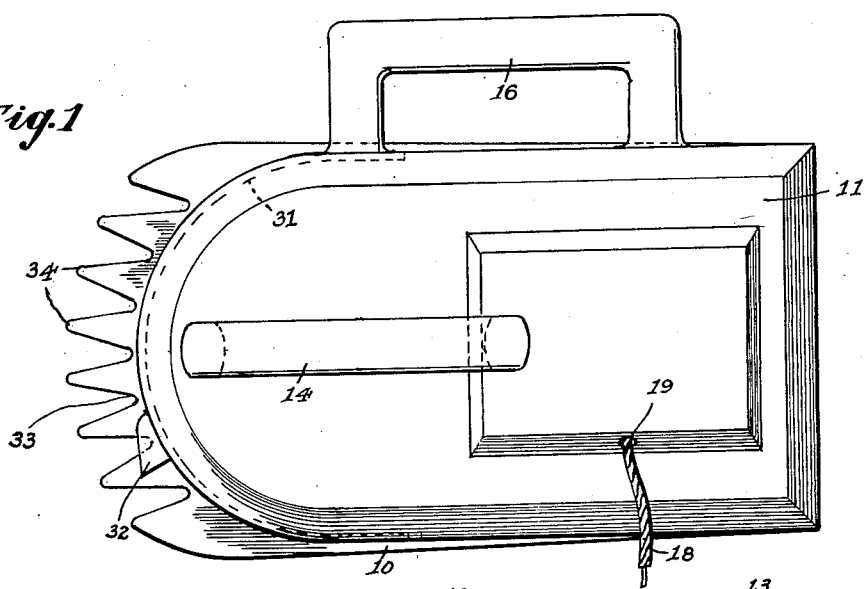
Figure 2:
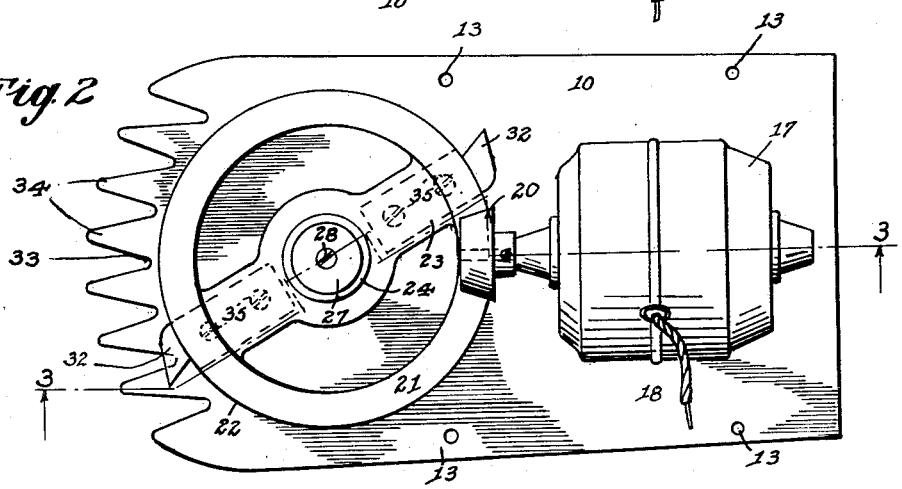
Fig. 2 is a similar view with the top cover removed.

Referring to the drawing and characters of reference marked thereon, it will be noted that the casing comprises a bottom plate member 10 which may be slightly heavier than that of the housing 11. The latter is formed to suitably enclose the operatable parts of the trimmer, and is adapted to be secured to the base by suitable screws 12 which extend through holes 13 in the base plate.

A handle 14 is secured to the top side of the housing by means of screws 15 while a handle 16 may be secured to the side of the housing in a similar manner. In practice, the machine is handled by the two hands of the operator, who grasps the top handle with the left hand and the side handle with the right.

The motor 17 may be of a commercial type and of relatively small fraction of a horse power, and connected to be driven through a relatively long wire 18 that is carried out through a hole 19 in the casing and provided with any suitable form of plug, not shown, for attachment to a socket.

A conical friction drive pulley 20 is attached to the end of the motor spindle and engages the bevelled top surface 21 of the wheel 22 which serves both as a cutter wheel and a fly wheel. The large proportion of the metal of this wheel, as will be noted, is in its annular rim portion, there being but two spokes 23, so-called, which support the rim portion on the hub 24. This wheel is mounted upon a post 25 that is firmly secured to the base plate by means of screws 26, a washer 27 and a screw 28 being provided for the engagement of the upper end of the post to hold the wheel down in close spaced running proximity to the top surface of the base plate. An upper and lower ball bearing 29 and 30 respectively are positioned intermediate of the said posts 25 and the bore of the hub of the wheel, whereby the free running of the wheel is assured.

In the above referred to connection of drive between the motor and cutter wheel, it will be seen that the diameter of the latter wheel is very much larger than the diameter of the bevelled driving wheel on the motor spindle; therefore a material reduction of speed of the motor is obtained in the cutting wheel, yet due to the rapid speed at which the motor rotates, ample speed is still provided for the drive of the cutter wheel.

Figure 3:
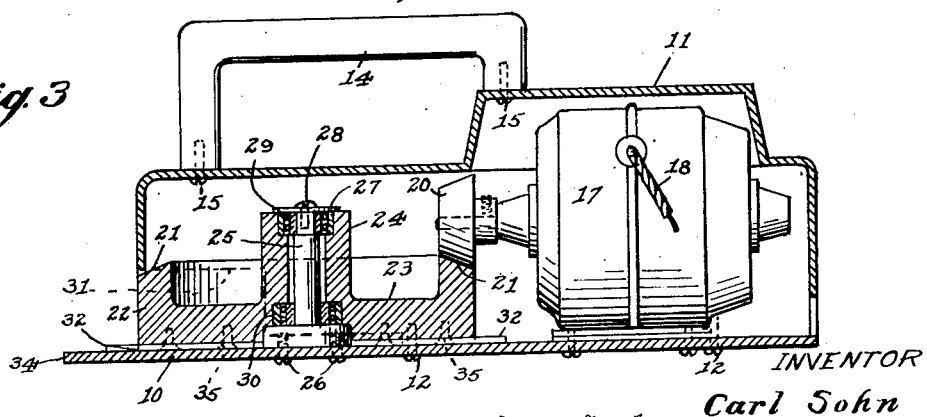
Fig. 3 shows a longitudinal section taken on line 3—3 of Fig. 2.

The forward lower portion of the housing 11 is cut away as indicated by the dotted line 31 in Figs. 1 and 3, which as will be seen allows the peripheral face of the wheel 21, which carries the cutters 32, to run flush, see Fig. 3, with the forward end of the casing and to allow the cutter blades to also project and swing around across the innermost portions of the pockets 33 between the fingers 34, and whereby the stems to be cut will be properly engaged as between the blade and the edges of the pockets.

It will be further observed that the cutting blades are secured to the underside of the spoke portion of the wheel by means of screws 35, the said cutters being positioned in suitable recesses on the underside of the wheel so that the same will finish flush with the undersurface of the wheel.

Having thus described my invention, what I claim and desire to secure by Letters Patent is:

1. A hedge trimmer of the class described, the same comprising a base plate having projected teeth, a bearing post secured to the top side of said base plate, a cutter wheel mounted on the post including a hub portion, and a relatively heavy rim portion having a bevelled driving surface, cutters secured to the underside of the wheel between it and the base plate and projecting from the periphery of the wheel, a motor secured to the base plate having a conical driving pulley in engagement with the bevelled surface of the cutter wheel for operating the latter, a housing enclosing the wheel and motor, means for detachably securing the same to the base plate and having an opening around its forward end portion to permit the cutters to pass therethrough.

2. A hedge trimmer of the class described, the same comprising a base plate having projected teeth, a bearing post secured to the top side of said base plate, a cutter wheel mounted upon the post including a hub portion, spokes and a relatively heavy rim portion having a bevelled driving surface, ball bearings intermediate the wheel and post, cutters secured to the underside of the wheel between it and the base plate and projecting from the periphery of the wheel, a motor secured to the base plate having a conical driving pulley in engagement with the bevelled surface of the cutter wheel for operating the latter, a housing enclosing the wheel and motor, means for detachably securing the same to the base plate and having an opening around its forward end portion to permit the wheel and cutters to operatively extend therethrough, and one or more handles secured to the housing whereby the trimmer may be manipulated.

Signed at Bridgeport in the county of Fairfield and State of Connecticut this 18th day of November, A. D. 1932.

CARL SOHN.